(12) United States Patent
Hatzilias et al.

(10) Patent No.: US 10,852,824 B1
(45) Date of Patent: Dec. 1, 2020

(54) INFRARED LIGHT SUPPRESSION IN EYE-TRACKING IMAGING

(71) Applicant: Facebook Technologies, LLC, Menlo Park, CA (US)

(72) Inventors: Karol Constantine Hatzilias, Kenmore, WA (US); Alexander Randon Cope, Seattle, WA (US); Qi Zhang, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/567,402

(22) Filed: Sep. 11, 2019

(51) Int. Cl.
*G06F 3/01* (2006.01)
*G02B 27/00* (2006.01)
*G02B 27/01* (2006.01)
*G02B 5/20* (2006.01)
*H04N 5/225* (2006.01)

(52) U.S. Cl.
CPC ............. *G06F 3/013* (2013.01); *G02B 5/208* (2013.01); *G02B 27/0093* (2013.01); *H04N 5/2254* (2013.01); *H04N 5/2256* (2013.01); *G02B 27/0172* (2013.01); *G02B 2027/0138* (2013.01); *G02B 2027/0174* (2013.01)

(58) Field of Classification Search
CPC .................................................. G02B 27/0093
See application file for complete search history.

(56) References Cited

U.S. PATENT DOCUMENTS

| 6,791,531 B1 * | 9/2004 | Johnston | G01J 3/433 |
| | | | 345/157 |
| 8,659,764 B2 * | 2/2014 | Hatzilias | G01B 11/25 |
| | | | 356/601 |
| 10,437,051 B2 * | 10/2019 | Popovich | G02B 6/34 |
| 2015/0172827 A1 * | 6/2015 | Sharpe | G06F 21/31 |
| | | | 381/312 |
| 2015/0312560 A1 * | 10/2015 | Deering | G02B 13/0085 |
| | | | 345/1.3 |
| 2016/0377868 A1 * | 12/2016 | Ouderkirk | G02B 6/0046 |
| | | | 359/485.01 |
| 2019/0041642 A1 * | 2/2019 | Haddick | G02B 27/0075 |
| 2019/0121132 A1 * | 4/2019 | Shamir | G02B 27/0172 |
| 2019/0271845 A1 * | 9/2019 | Cormier | G06F 3/0484 |
| 2019/0293838 A1 * | 9/2019 | Haba | G02B 27/14 |
| 2020/0064627 A1 * | 2/2020 | Ouderkirk | G06F 3/013 |

* cited by examiner

*Primary Examiner* — Paulos M Natnael
(74) *Attorney, Agent, or Firm* — Freestone Intellectual Property Law PLLC; Aaron J. Visbeek; Andrew J. Cameron

(57) ABSTRACT

A near-eye optical element, according to aspects herein, includes an illumination layer, an optical combiner layer, and an infrared absorber layer. The illumination layer includes infrared light sources configured to direct narrow-band infrared illumination light to an eyeward side of the near-eye optical element for eye tracking. The optical combiner layer is configured to receive reflected infrared light of the narrow-band infrared illumination light that is reflected off an eye of a user and to direct the reflected infrared light to a camera to generate an eye-tracking image. The infrared absorber layer is disposed between the optical combiner layer and a backside of the near-eye optical element to absorb infrared interference light of the narrow-band.

20 Claims, 4 Drawing Sheets

INFRARED LIGHT SUPPRESSION IN EYE-TRACKING IMAGING

BACKGROUND INFORMATION

A head mounted device is a wearable optical system, typically worn on the head of a user. Head mounted devices may include one or more electronic components for use in a variety of applications, such as gaming, aviation, engineering, medicine, entertainment, activity tracking, and so on. Some head mounted devices may perform eye-tracking which may enhance the user's viewing experience. Eye-tracking may be aided, in some cases, by illuminating the eye of the user. Thus, some conventional head mounted devices may incorporate an eye-tracking system that includes an illumination source as well as a camera for tracking movements of the user's eye. However, various contexts may generate challenges to capturing images of the eye that include sufficient contrast for analyzing the images. In particular, stray light may propagate through the optical system to the camera, thereby increasing noise in the captured images.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
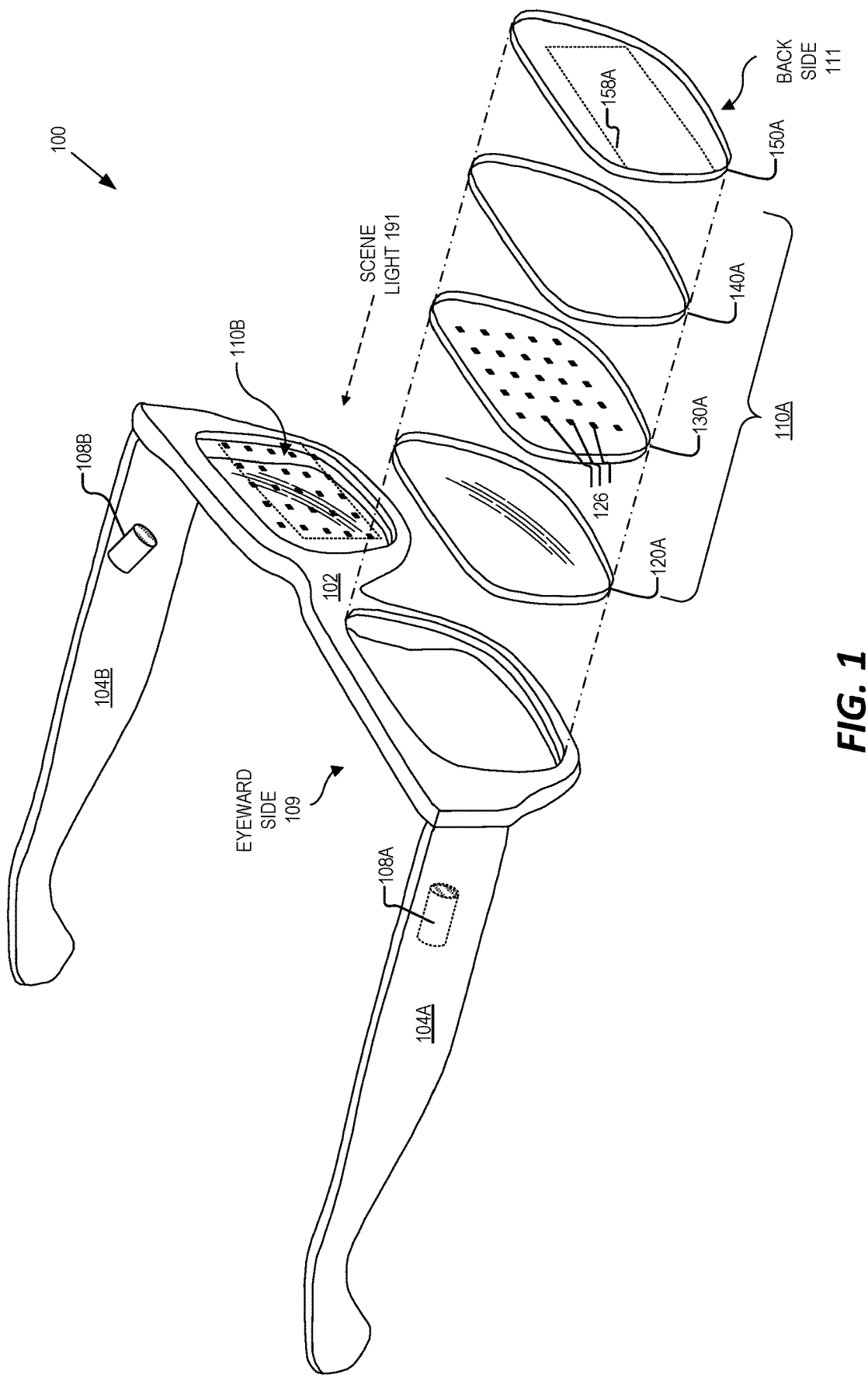
FIG. 1 illustrates an example head mounted display (HMD), in accordance with aspects of the present disclosure.

Embodiments of an optical system, a near-eye optical element, and a head-mounted device for infrared light suppression in eye-tracking imaging are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The system and device for suppressing infrared light in eye-tracking images that are described in this disclosure include incorporating infrared absorbing components into an optical system. Optical systems that perform eye-tracking may include one or more infrared light sources to illuminate the eye with infrared light as well as an eye-tracking camera to image the eye in response to reflected infrared light that reflects off the eye. In some systems, interference infrared light may become incident on the camera, thereby reducing the effective signal-to-noise ratio of the eye-tracking system. The interference infrared light may be caused by infrared illumination light unintentionally reflecting off one or more surfaces/interfaces of the optical system. Some optical systems may include one or more multi-layer anti-reflective (AR) coatings applied to one or more surfaces to allow the interference infrared light to escape the optical system rather than being reflected back towards the camera. Other infrared interference light may also be caused by external infrared light being incident on the optical system, such as infrared light received from the environment. Thus, some optical systems may include an infrared reflecting layer to prevent external infrared light from propagating through the system.

In contrast to the AR coatings and infrared reflecting layers discussed above, embodiments of this disclosure include an infrared absorber layer that is strategically positioned within the optical system (i.e., within the stack of optical elements) to suppress/absorb infrared interference light. The infrared absorber layers in this disclosure may be specially tuned to transmit a very-high percentage of visible light while absorbing infrared interference light. Optical systems of the disclosure may benefit from the transmission of visible light and the suppression of infrared interference light due to the requirements of an optical system to pass visible scene light and/or visible display light, in the context of a head mounted device. These and other embodiments are described in more detail in connection with FIGS. 1-4.

FIG. 1 illustrates an example HMD 100, in accordance with aspects of the present disclosure. The illustrated example of HMD 100 is shown as including a frame 102, temple arms 104A and 104B, and near-eye optical elements 110A and 110B. Eye-tracking cameras 108A and 108B are shown as coupled to temple arms 104A and 104B, respectively. FIG. 1 also illustrates an exploded view of an example of near-eye optical element 110A. Near-eye optical element 110A is shown as including an optically transparent layer 120A, an illumination layer 130A, an optical combiner layer 140A, and a display layer 150A. Illumination layer 130A is shown as including a plurality of in-field infrared light sources 126. The in-field infrared light source 126 may be configured to emit infrared illumination light for eye-tracking purposes, for example. Display layer 150A may include a waveguide 158A that is configured to direct virtual images to an eye of a user of HMD 100.

An HMD, such as HMD 100 is one type of head mounted device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

As shown in FIG. 1, frame 102 is coupled to temple arms 104A and 104B for securing the HMD 100 to the head of a user. Example HMD 100 may also include supporting hardware incorporated into the frame 102 and/or temple arms 104A and 104B. The hardware of HMD 100 may include any of processing logic, wired and/or wireless data interfaces for sending and receiving data, graphic processors, and one or more memories for storing data and computerexecutable instructions. In one example, HMD 100 may be configured to receive wired power and/or may be configured to be powered by one or more batteries. In addition, HMD 100 may be configured to receive wired and/or wireless data including video data.

FIG. 1 illustrates near-eye optical elements 110A and 110B that are configured to be mounted to the frame 102. In some examples, near-eye optical elements 110A and 110B may appear transparent to the user to facilitate augmented reality or mixed reality such that the user can view visible scene light 191 from the environment while also receiving display light directed to their eye(s) by way of display layer 150A. In further examples, some or all of the near-eye optical elements 110A and 110B may be incorporated into a virtual reality headset where the transparent nature of the near-eye optical elements 110A and 110B allows the user to view an electronic display (e.g., a liquid crystal display (LCD), an organic light emitting diode (OLED) display, a micro-LED display, etc.) incorporated in the virtual reality headset.

As shown in FIG. 1, illumination layer 130A includes a plurality of in-field infrared light sources 126. Each in-field infrared light source 126 may be disposed on a transparent substrate and may be configured to emit infrared illumination light towards an eyeward side 109 of the near-eye optical element 110A. In some aspects of the disclosure, the in-field infrared light sources 126 are configured to emit near infrared light (e.g. 700 nm-1.4 µm). Each in-field infrared light source 126 may be a micro light emitting diode (micro-LED), an edge emitting LED, a vertical cavity surface emitting laser (VCSEL) diode, or a Superluminescent diode (SLED). In other embodiments, each in-field infrared light source 126 may be an exit feature of a waveguide, included in illumination layer 130A, where the waveguide is configured to direct infrared light emitted from a VCSEL diode or other light source incorporated into the rim of frame 102 to the exit feature for illuminating the eye of the user.

Conventional eye-tracking solutions may provide light sources disposed around a rim/periphery of a lens. However, placing light sources within the field of view of the eye may be advantageous for computation of specular or "glint" reflections that can be imaged by a camera such as eye-tracking camera 108A that is positioned to image the eye of a wearer of HMD 100.

While in-field infrared light sources 126 may introduce minor occlusions into the near-eye optical element 110A, the in-field infrared light sources 126, as well as their corresponding routing may be so small as to be unnoticeable or insignificant to a wearer of HMD 100. Additionally, any occlusion from in-field infrared light sources 126 will be placed so close to the eye as to be unfocusable by the human eye and therefore assist in the in-field infrared light sources 126 being not noticeable or insignificant. In some embodiments, each in-field infrared light source 126 has a footprint (or size) that is less than about 200×200 microns.

As mentioned above, the in-field infrared light sources 126 of the illumination layer 130A may be configured to emit infrared illumination light towards the eyeward side 109 of the near-eye optical element 110A to illuminate the eye of a user. The near-eye optical element 110A is shown as including optical combiner layer 140A disposed between the illumination layer 130A and a backside 111 of the near-eye optical element 110A. In some aspects, the optical combiner layer 140A is configured to receive reflected infrared light that is reflected by the eye of the user and to direct the reflected infrared light towards the eye-tracking camera 108A. In some examples, the eye-tracking camera 108A is an infrared camera configured to image the eye of the user based on the received reflected infrared light. In some aspects, the optical combiner layer 140A is transmissive to visible light, such as scene light 191 incident on the backside 111 of the near-eye optical element 110A. In some examples, the optical combiner layer 140A may be configured as a volume hologram and/or may include one or more Bragg gratings for directing the reflected infrared light towards the eye-tracking camera 108A. In some examples, the optical combiner layer 140A includes a polarization-selective hologram (a.k.a. polarized volume hologram) that diffracts a particular polarization orientation of incident light while passing other polarization orientations. In other examples, the optical combiner layer 140A includes one or more Fresnel optical elements that are configured to direct the reflected infrared light to the camera while also allowing visible light to propagate through the near-eye optical element 110A. By way of example a Fresnel optical element, included in the optical combiner layer 140A, may include active surfaces that are selectively coated with a "hot mirror" layer (reflecting infrared light and passing visible light) to direct infrared light to a camera while also passing visible light for viewing by the wearer of the HMD 100.

Display layer 150A may include one or more other optical elements depending on the design of the HMD 100. For example, the display layer 150A may include a waveguide 158A to direct display light generated by an electronic display to the eye of the user. In some implementations, at least a portion of the electronic display is included in the frame 102 of the HMD 100. The electronic display may include an LCD, an organic light emitting diode (OLED) display, micro-LED display, pico-projector, or liquid crystal on silicon (LCOS) display for generating the display light.

Optically transparent layer 120A is shown as being disposed between the illumination layer 130A and the eyeward side 109 of the near-eye optical element 110A. The optically transparent layer 120A may receive the infrared illumination light emitted by the illumination layer 130A and pass the infrared illumination light to illuminate the eye of the user. As mentioned above, the optically transparent layer 120A may also be transparent to visible light, such as scene light 191 received from the environment and/or display light received from the display layer 150A. In some examples, the optically transparent layer 120A has a curvature for focusing light (e.g., display light and/or scene light) to the eye of the user. Thus, the optically transparent layer 120A may, in some examples, may be referred to as a lens. In some aspects, the optically transparent layer 120A has a thickness and/or curvature that corresponds to the specifications of a user. In other words, the optically transparent layer 120A may be a prescription lens. However, in other examples, the optically transparent layer 120A may be a non-prescription lens.

Figure 2:
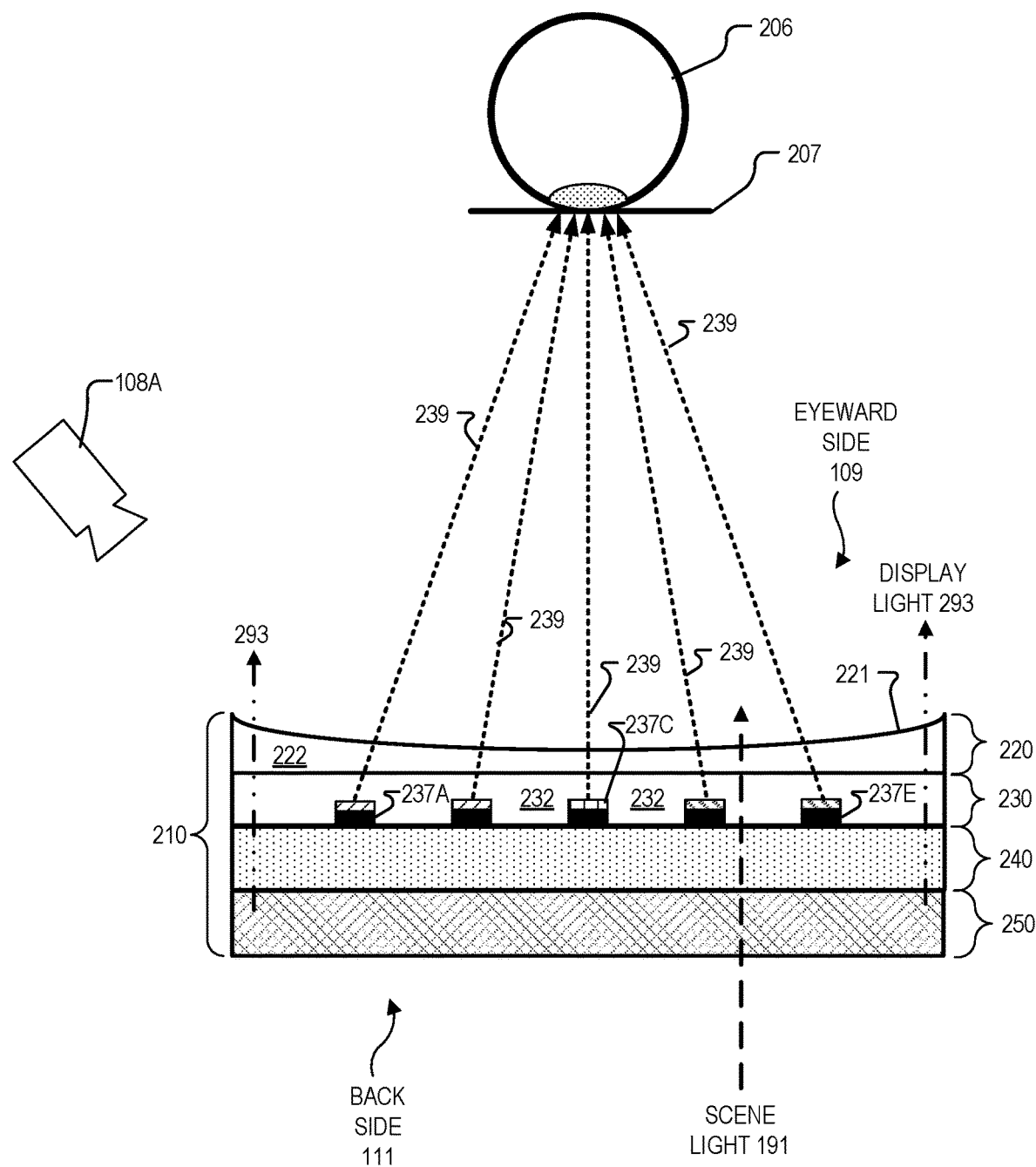
FIG. 2 is a top view of an example near-eye optical element that includes a transparent layer, an illumination layer, an optical combiner layer, and a display layer.

FIG. 2 is a top view of an example near-eye optical element 210 that includes a transparent layer 220, an illumination layer 230, an optical combiner layer 240, and a display layer 250. A plurality of infrared light sources 237A-237E emit infrared illumination light 239 to an eyebox area 207 on the eyeward side 109 of the near-eye optical element 210 to illuminate eye 206. The different infrared light sources 237A-237E may direct infrared illumination light 239 to eye 206 at different angles depending on the position of the infrared light sources 237A-237E with respect to eye 206. For example, infrared light sources 237A and 237E may include beam-forming elements that direct the infrared illumination light to eye 206 at steeper angles compared to infrared light source 237C directing infrared illumination light 239 to eye 206 at an angle closer to normal. As described above, infrared light sources 237A-237E may be VCSELs or SLEDs, and consequently infrared illumination light 239 may be narrow-band infrared illumination light (e.g. linewidth of 1-10 nm).

Figure 4:
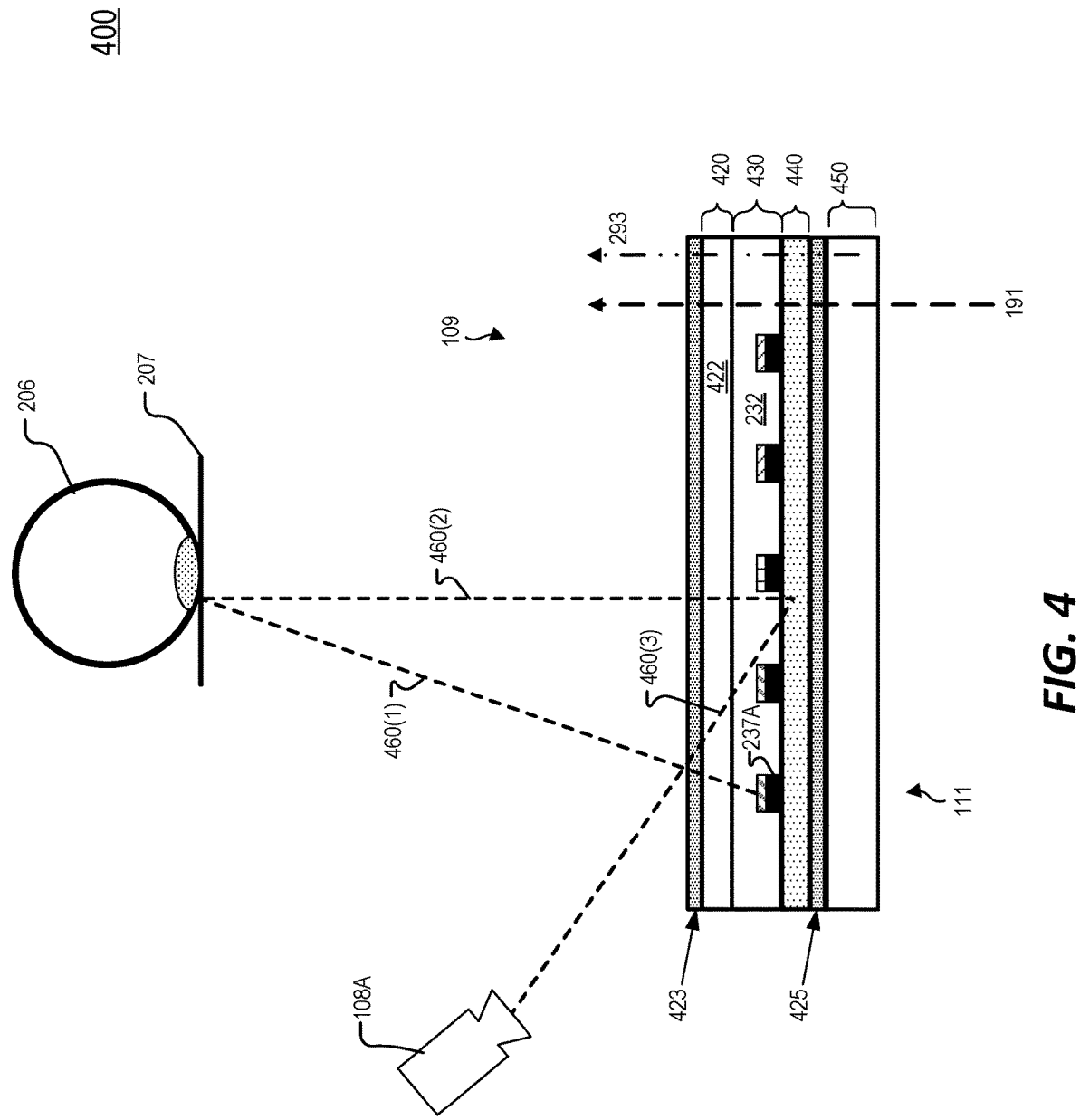
FIG. 4 illustrates an example optical system including an infrared absorber layer, in accordance with aspects of the disclosure.

Eye 206 reflects at least a portion of the infrared illumination light 239 back to near-eye optical element 210 as reflected infrared light (not illustrated in FIG. 2) and the reflected infrared light propagates through layers 220 and 230 before encountering the optical combiner layer 240. Optical combiner layer 240 is configured to receive the reflected infrared light and direct the reflected infrared light to the camera 108A to generate eye-tracking images. As an example, FIG. 4 illustrates reflected infrared light propagating along optical path 460(2) being redirected to camera 108A by optical combiner layer 440.

Returning to FIG. 2, camera 108A is configured to capture eye-tracking images of eye 206. In some examples, camera 108A includes an infrared bandpass filter having a center wavelength corresponding to an infrared wavelength of the infrared illumination light 239. Thus, the bandpass filter may pass the wavelength of the infrared illumination light 239 emitted by the infrared light sources and block other light from becoming incident on an image sensor of camera 108A. Camera 108A may include a complementary metal-oxide semiconductor (CMOS) image sensor.

FIG. 2 shows that scene light 191 (visible and infrared light) from the external environment may propagate through display layer 250, optical combiner layer 240, illumination layer 230, and transparent layer 220 to become incident on eye 206 so that a user can view the scene of an external environment. FIG. 2 shows that display layer 250 may generate or redirect display light 293 to present virtual images to eye 206. Display light 293 is visible light and propagates through the optical combiner layer 240, illumination layer 230, and transparent layer 220 to reach eye 206.

In some examples, transparent layer 220 may include a base curvature 221 that is the surface closest to eyeward side 109. Base curvature 221 may be configured to focus a virtual image included in display light 293 for an eye of a user. Base curvature 221 may be formed in a refractive material 222 of transparent layer 220 using a subtractive process. The refractive material 222 may have a refractive index of approximately 1.5, in some embodiments. Illumination layer 230 may include a transparent material 232 that may encapsulate the infrared illuminators 237. Transparent material 232 and refractive material 222 are configured to transmit visible light (e.g. 400 nm-700 nm) and near-infrared light (e.g. 700 nm-1.4 μm).

Figure 3:
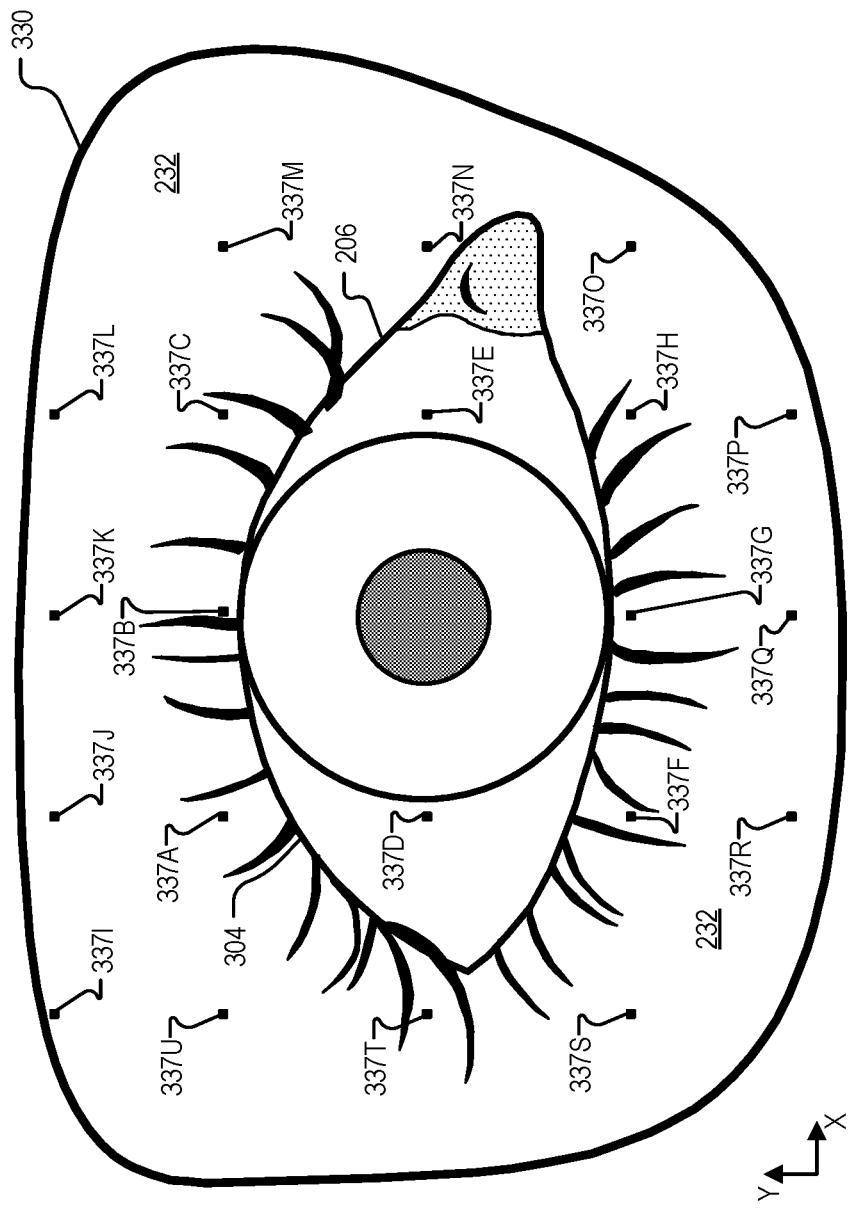
FIG. 3 illustrates a front view of an eye through an example illumination layer, in accordance with aspects of the disclosure.

FIG. 3 illustrates a front view of eye 206 through an example illumination layer 330, in accordance with aspects of the disclosure. In the illustrated embodiment, illumination layer 330 include twenty-one infrared light sources (337A-337U). In the illustrated example, infrared light sources 337A-337H may be considered an "inner ring" of infrared light sources while infrared light sources 337I-337U are considered an "outer ring" of infrared light sources. In some examples, infrared light sources 337I-337U may direct their infrared illumination light to eye 206 at a steeper angle (e.g. 14-25 degrees) than infrared light sources 337A-337H in the inner ring (e.g. 0-22 degrees).

FIG. 4 illustrates an example optical system 400 including an infrared absorber layer 425, in accordance with aspects of the disclosure. The illustrated example of optical system 400 is shown as including camera 108A, a transparent layer 420, an illumination layer 430, an optical combiner layer 440, an optional anti-reflective (AR) coating 423, infrared absorber layer 425, and an additional layer 450. The illumination layer 430 is shown as including several infrared light sources, such as infrared light source 237A.

As shown in FIG. 4, infrared light source 237A is configured to generate and then direct narrow-band infrared illumination light to an eyebox area 207 along optical path 460(1). FIG. 4 further illustrates the narrow-band infrared illumination light reflecting off the eye 206 and then returning to the optical system along optical path 460(2). The reflected infrared light then passes through the optional AR coating 423, through the transparent layer 420, through the illumination layer 430, and then is incident on the optical combiner layer 440.

As shown, the optical combiner layer 440 then directs the reflected infrared light to the camera 108A on the eyeward side 109 along optical path 460(3). However, some reflected infrared light (e.g., reflected infrared light received at the optical combiner layer 440 at high angles of incidence) may propagate through the optical combiner layer 440 rather than being directed back towards the camera 108A. In the absence of infrared absorber layer 425, this reflected infrared light that passes through the optical combiner layer 440 may reflect off one or more other layers or surfaces of the optical system, such as additional layer 450. For example, after passing through the optical combiner layer 440, the reflected infrared light may reflect off the additional layer 450 (e.g., display layer 250 of FIG. 2 and/or a backside transparent layer or lens). In some configurations, there may be a physical air gap between one or more of the layers, such as between the optical combiner layer 440 and the additional layer 450 and/or between one or more components of the additional layer 450, itself. These air gaps may increase the likelihood of unwanted infrared light being reflected back towards the camera 108A. Regardless, the stray infrared light may then be received by the camera 108A as interference infrared light, appearing as noise in the resultant eye-tracking images. In addition, scene light 191 may include external infrared light that is received from the environment. This external infrared light may be received by the camera 108A, also as interference infrared light. The interference infrared light, whether it be reflected infrared light that propagates through the optical combiner layer 440 or external infrared light received from the backside 111 of the optical system 400 may appear as noise in the images captured by camera 108A, effectively reducing the signal-to-noise ratio of the eye-tracking system. Accordingly, embodiments of the present disclosure include incorporating an infrared absorbing layer 425 on the backside of the optical combiner layer 440 to suppress such infrared interference light.

In some aspects, the infrared absorbing layer 425 is a paint (e.g., a wet coat) that is applied to a surface (i.e., on the backside 111) of the optical combiner layer 440. The paint may include a homogenous solution of an infrared absorbing solute or dye dissolved in a solvent, such as methanol or acetone. In other examples, infrared absorbing layer 425 may be a thin film (e.g., a laminate) that is adhered to the backside 111 of the optical combiner layer 440. In yet another aspect, the infrared absorbing layer 425 may be fabricated in situ as an internal layer of the optical combiner layer 440. As shown, the infrared absorbing layer 425 may be disposed between the optical combiner layer 440 and the other layer 450 (e.g., display layer and/or backside lens). In some examples, infrared absorbing layer 425 is disposed directly on the surface of the optical combiner layer 440 (i.e., without any other intervening optical interfaces therebetween).

As mentioned above, infrared absorbing layer 425 may be specially tuned to transmit a high percentage of visible light while absorbing infrared interference light. By way of example, the infrared absorbing layer 425 may be configured to absorb 70% or more of the infrared interference light that is incident on the infrared absorbing layer 425, while allowing 90% or more of visible light to pass through the infrared absorbing layer 425. In some embodiments, the absorptivity/transmissiveness of the infrared absorbing layer scales across both the visible spectrum and the infrared spectrum, such that a lower absorptivity in the infrared spectrum means that the impact in the visible spectrum may be proportionally reduced. Accordingly, in some aspects, the absorptivity of the infrared absorbing layer 425 need not be maximized to provide sufficient absorption of the infrared interference light while also providing sufficient transmission of visible light. Test results performed by applicant nonintuitively indicate that a lower absorptivity (e.g., 20% absorptivity to infrared interference light) may provide adequate absorption of the infrared interference light while simultaneously providing very little absorption in the visible spectrum (e.g., 1% or less). In some examples, the infrared absorptivity of the infrared absorbing layer 425 may be tuned by adjusting the thickness of infrared absorbing layer 425 and/or adjusting the concentration of infrared absorbing material including the infrared absorbing layer 425.

As mentioned above, the infrared illumination light emitted by the infrared light source 237A may be narrow-band infrared illumination light (e.g. linewidth of 1-10 nm). In some examples, the narrow-band infrared illumination light is centered around an infrared wavelength (e.g., 940 nm). In addition, the camera 108A may include an infrared bandpass filter having a center wavelength corresponding to the wavelength of the narrow-band infrared illumination light. For example, the bandpass filter may have a center wavelength that is the same as (e.g., 940 nm), or at least overlaps with the narrow-band of the infrared illumination light. Accordingly, the infrared absorber layer 425 may be tuned to have a peak absorptivity at a wavelength that corresponds to that of the narrow-band infrared illumination light (e.g., infrared absorber layer 425 may have a peak absorptivity at 940 nm).

In some examples, the infrared absorber layer 425 may be tuned for very-high transmission for visible light and for very-high absorption over a significant range of narrow-band infrared light (937 nm-950 nm). The infrared absorber layer 425 may also be specifically tuned for very-high absorption of narrow-band infrared illumination light corresponding with the infrared light source 237A emitting 940 nm light, for example. In other embodiments, the narrow-band of infrared light may have different wavelengths. The transmission spectrum of an infrared absorber layer may be tuned for less than very-high absorption of at least a portion of gap-light having wavelengths between the visible light and the narrow-band of infrared light (e.g. 700 nm-937 nm).

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical system, comprising:
   an illumination layer that includes at least one in-field infrared light source configured to direct narrow-band infrared illumination light to an eyeward side of the optical system for eye-tracking;
   a camera configured to capture eye-tracking images of an eye of a user;
   an optical combiner disposed between the at least one in-field infrared light source and a backside of the optical system, wherein the optical combiner is configured to receive reflected infrared light of the narrow-band infrared illumination light that is reflected off the eye of the user and to direct the reflected infrared light to the camera to generate the eye-tracking images; and
   an infrared absorber disposed between the optical combiner and the backside of the optical system, wherein the infrared absorber is configured to absorb infrared interference light of the narrow-band.

2. The optical system of claim 1, wherein the infrared interference light comprises reflected infrared light that propagates through the optical combiner to the infrared absorber.

3. The optical system of claim 1, wherein the infrared interference light comprises external infrared light received from the backside of the optical system.

4. The optical system of claim 1, wherein the infrared absorber is transmissive to visible light.

5. The optical system of claim 1, further comprising:
   a display layer disposed between the infrared absorber and the backside of the optical system, the display layer configured to provide display light that propagates through the infrared absorber and the optical combiner to the eyeward side of the optical system.

6. The optical system of claim 1, wherein:
   the at least one in-field infrared light source is configured to emit the narrow-band infrared illumination light that is centered around an infrared wavelength;

the camera includes an infrared bandpass filter having a center wavelength corresponding to the infrared wavelength to pass the reflected infrared light; and the infrared absorber includes a peak absorptivity at a wavelength corresponding to the infrared wavelength of the narrow-band infrared illumination light.

7. The optical system of claim 6, wherein the infrared wavelength is 940 nm.

8. The optical system of claim 1, wherein the infrared absorber comprises a paint applied to a surface of the optical combiner.

9. The optical system of claim 1, wherein the infrared absorber comprises an optical film disposed on a surface of the optical combiner.

10. A near-eye optical element, comprising:
an illumination layer including a plurality of infrared light sources configured to direct narrow-band infrared illumination light to an eyeward side of the near-eye optical element for eye tracking;
an optical combiner layer disposed between the illumination layer and a backside of the near-eye optical element, the optical combiner layer configured to receive reflected infrared light of the narrow-band infrared illumination light that reflects off an eye of a user and to direct the reflected infrared light to a camera to generate an eye-tracking image; and
an infrared absorber layer disposed between the optical combiner layer and the backside of the near-eye optical element, wherein the infrared absorber layer is configured to absorb infrared interference light of the narrow-band.

11. The near-eye optical element of claim 10, wherein the infrared interference light comprises reflected infrared light that propagates through the optical combiner layer to the infrared absorber layer.

12. The near-eye optical element of claim 11, wherein the infrared interference light comprises reflected infrared light that propagates through the illumination layer and through the optical combiner layer to the infrared absorber layer.

13. The near-eye optical element of claim 10, wherein the infrared interference light comprises external infrared light received at the backside of the near-eye optical element.

14. The near-eye optical element of claim 10, wherein the infrared absorber layer is transmissive to visible light.

15. The near-eye optical element of claim 10, further comprising:
a display layer disposed between the infrared absorber layer and the backside of the near-eye optical element, the display layer configured to provide display light that propagates through the infrared absorber layer and the optical combiner layer to the eyeward side of the near-eye optical element.

16. The near-eye optical element of claim 10, wherein the infrared light sources are configured to emit the narrow-band infrared illumination light that is centered around 940 nm.

17. The near-eye optical element of claim 10, wherein the infrared absorber layer comprises a paint applied to a surface of the optical combiner layer or an optical film disposed on the surface of the optical combiner layer.

18. A head-mounted device, comprising:
a camera configured to generate eye-tracking images in response to reflected infrared light that is reflected off an eye of a user of the head-mounted device;
a near-eye optical element that includes:
an illumination layer including a plurality of in-field infrared light sources configured to generate narrow-band infrared illumination light to illuminate the eye of the user;
an optical combiner layer disposed between the illumination layer and a backside of the near-eye optical element, wherein the optical combiner layer is configured to receive the reflected infrared light of the narrow-band infrared illumination light reflected off the eye of the user and to direct the reflected infrared light to the camera; and
an infrared absorber layer disposed between the optical combiner layer and the backside of the near-eye optical element, wherein the infrared absorber layer is configured to absorb infrared interference light of the narrow-band.

19. The head-mounted device of claim 18, wherein the infrared interference light comprises at least one of: reflected infrared light that propagates through the optical combiner layer to the infrared absorber layer, or external infrared light received at the backside of the near-eye optical element.

20. The head-mounted device of claim 18, wherein:
the infrared illumination light has a wavelength of 940 nm;
the camera includes an infrared bandpass filter to pass the reflected infrared light having the wavelength of 940 nm; and
the infrared absorber layer is configured to absorb the infrared interference light having the wavelength of 940 nm.

* * * * *